United States Patent
Narayan et al.

(10) Patent No.: US 10,412,060 B2
(45) Date of Patent: Sep. 10, 2019

(54) TOKEN ENROLLMENT SYSTEM AND METHOD

(71) Applicant: VISA INTERNATIONAL SERVICE ASSOCIATION, San Francisco, CA (US)

(72) Inventors: Prasanna L. Narayan, San Ramon, CA (US); Karthikeyan Palanisamy, Dublin, CA (US); Ramji Sethuraman, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/991,914

(22) Filed: May 29, 2018

(65) Prior Publication Data

US 2018/0295104 A1 Oct. 11, 2018

Related U.S. Application Data

(63) Continuation of application No. 14/920,618, filed on Oct. 22, 2015, now Pat. No. 10,015,147.
(Continued)

(51) Int. Cl.
*H04L 29/06* (2006.01)
*H04L 9/14* (2006.01)
*H04L 9/08* (2006.01)

(52) U.S. Cl.
CPC .......... *H04L 63/0428* (2013.01); *H04L 9/083* (2013.01); *H04L 9/0822* (2013.01);
(Continued)

(58) Field of Classification Search
None
See application file for complete search history.

(56) References Cited

U.S. PATENT DOCUMENTS 5,613,012 A   3/1997  Hoffman et al.
5,625,694 A *  4/1997  Lee ...................... G06Q 20/401
                                                        380/51
(Continued)

FOREIGN PATENT DOCUMENTS

EP      2156397 A1    2/2010
WO   2001035304 A1    5/2001
(Continued)

OTHER PUBLICATIONS

Lu, Lin; Li, Fangwei. Micro-payment Mechanism and Improved Analysis Based on Pay Word. 2012 9th International Conference on Fuzzy Systems and Knowledge Discovery. https://ieeexplore.ieee.org/stamp/stamp.jsp?tp=&arnumber=6233709 (Year: 2012).*
(Continued)

*Primary Examiner* — Jeremiah L Avery
(74) *Attorney, Agent, or Firm* — Kilpatrick Townsend & Stockton LLP

(57) ABSTRACT

Embodiments of the invention are directed to methods, apparatuses, computer readable media and systems for providing a token service environment that allows a token requesting party (e.g. token requestor) to specify parameters for token generation for controlling and customizing the token generation process. For example, the token requesting party may specify (e.g. select from a list or provide a list of) the accounts for tokenization. The accounts may be identified by account identifiers (e.g. account numbers) or bank identification numbers (BINs). The token requesting party may also specify encryption keys for the tokens to be generated. The token requesting party may also specify additional parameters such as notification thresholds indicating when notifications associated with the tokens are to be generated.

10 Claims, 16 Drawing Sheets

Related U.S. Application Data

(60) Provisional application No. 62/067,336, filed on Oct. 22, 2014.

(52) U.S. Cl.
CPC .......... H04L 9/14 (2013.01); *H04L 63/0876* (2013.01); *H04L 2209/24* (2013.01); *H04L 2209/56* (2013.01); *H04L 2463/102* (2013.01)

(56) References Cited

U.S. PATENT DOCUMENTS

| | | | |
|---|---|---|---|
| 5,781,438 | A | 7/1998 | Lee et al. |
| 5,883,810 | A | 3/1999 | Franklin et al. |
| 5,953,710 | A | 9/1999 | Fleming |
| 5,956,699 | A | 9/1999 | Wong et al. |
| 6,000,832 | A | 12/1999 | Franklin et al. |
| 6,014,635 | A | 1/2000 | Harris et al. |
| 6,044,360 | A | 3/2000 | Picciallo |
| 6,163,771 | A | 12/2000 | Walker et al. |
| 6,227,447 | B1 | 5/2001 | Campisano |
| 6,236,981 | B1 | 5/2001 | Hill |
| 6,267,292 | B1 | 7/2001 | Walker et al. |
| 6,327,578 | B1 | 12/2001 | Linehan |
| 6,341,724 | B2 | 1/2002 | Campisano |
| 6,385,596 | B1 | 5/2002 | Wiser et al. |
| 6,422,462 | B1 | 7/2002 | Cohen |
| 6,425,523 | B1 | 7/2002 | Shem-Ur et al. |
| 6,592,044 | B1 | 7/2003 | Wong et al. |
| 6,636,833 | B1 | 10/2003 | Flitcroft et al. |
| 6,748,367 | B1 | 6/2004 | Lee |
| 6,805,287 | B2 | 10/2004 | Bishop et al. |
| 6,879,965 | B2 | 4/2005 | Fung et al. |
| 6,891,953 | B1 | 5/2005 | DeMello et al. |
| 6,901,387 | B2 | 5/2005 | Wells et al. |
| 6,931,382 | B2 | 8/2005 | Laage et al. |
| 6,938,019 | B1 | 8/2005 | Uzo |
| 6,941,285 | B2 | 9/2005 | Sarcanin |
| 6,980,670 | B1 | 12/2005 | Hoffman et al. |
| 6,985,583 | B1 | 1/2006 | Brainard |
| 6,990,470 | B2 | 1/2006 | Hogan et al. |
| 6,991,157 | B2 | 1/2006 | Bishop et al. |
| 7,051,929 | B2 | 5/2006 | Li |
| 7,069,249 | B2 | 6/2006 | Stolfo et al. |
| 7,103,576 | B2 | 9/2006 | Mann, III et al. |
| 7,113,930 | B2 | 9/2006 | Eccles et al. |
| 7,136,835 | B1 | 11/2006 | Flitcroft et al. |
| 7,177,835 | B1 | 2/2007 | Walker et al. |
| 7,177,848 | B2 | 2/2007 | Hogan et al. |
| 7,194,437 | B1 | 3/2007 | Britto et al. |
| 7,209,561 | B1 | 4/2007 | Shankar et al. |
| 7,264,154 | B2 | 9/2007 | Harris |
| 7,287,692 | B1 | 10/2007 | Patel et al. |
| 7,292,999 | B2 | 11/2007 | Hobson et al. |
| 7,350,230 | B2 | 3/2008 | Forrest |
| 7,353,382 | B2 | 4/2008 | Labrou et al. |
| 7,379,919 | B2 | 5/2008 | Hogan et al. |
| RE40,444 | E | 7/2008 | Linehan |
| 7,415,443 | B2 | 8/2008 | Hobson et al. |
| 7,444,676 | B1 | 10/2008 | Asghari-Kamrani et al. |
| 7,469,151 | B2 | 12/2008 | Khan et al. |
| 7,548,889 | B2 | 6/2009 | Bhambri et al. |
| 7,552,467 | B2 * | 6/2009 | Lindsay ............... G06F 21/31 726/5 |
| 7,567,934 | B2 | 7/2009 | Flitcroft et al. |
| 7,567,936 | B1 | 7/2009 | Peckover et al. |
| 7,571,139 | B1 | 8/2009 | Giordano et al. |
| 7,571,142 | B1 | 8/2009 | Flitcroft et al. |
| 7,580,898 | B2 | 8/2009 | Brown et al. |
| 7,584,153 | B2 | 9/2009 | Brown et al. |
| 7,593,896 | B1 | 9/2009 | Flitcroft et al. |
| 7,606,560 | B2 | 10/2009 | Labrou et al. |
| 7,627,531 | B2 | 12/2009 | Breck et al. |
| 7,627,895 | B2 | 12/2009 | Gifford et al. |
| 7,650,314 | B1 | 1/2010 | Saunders |
| 7,685,037 | B2 | 3/2010 | Reiners et al. |
| 7,702,578 | B2 | 4/2010 | Fung et al. |
| 7,707,120 | B2 | 4/2010 | Dominguez et al. |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II et al. |
| 7,784,685 | B1 | 8/2010 | Hopkins, III |
| 7,793,851 | B2 | 9/2010 | Mullen |
| 7,801,826 | B2 | 9/2010 | Labrou et al. |
| 7,805,376 | B2 | 9/2010 | Smith |
| 7,805,378 | B2 | 9/2010 | Berardi et al. |
| 7,818,264 | B2 | 10/2010 | Hammad |
| 7,828,220 | B2 | 11/2010 | Mullen |
| 7,835,960 | B2 | 11/2010 | Breck et al. |
| 7,841,523 | B2 | 11/2010 | Oder, II et al. |
| 7,841,539 | B2 | 11/2010 | Hewton |
| 7,844,550 | B2 | 11/2010 | Walker et al. |
| 7,848,980 | B2 | 12/2010 | Carlson |
| 7,849,020 | B2 | 12/2010 | Johnson |
| 7,853,529 | B1 | 12/2010 | Walker et al. |
| 7,853,995 | B2 | 12/2010 | Chow et al. |
| 7,865,414 | B2 | 1/2011 | Fung et al. |
| 7,873,579 | B2 | 1/2011 | Hobson et al. |
| 7,873,580 | B2 | 1/2011 | Hobson et al. |
| 7,890,393 | B2 | 2/2011 | Talbert et al. |
| 7,891,563 | B2 | 2/2011 | Oder, II et al. |
| 7,896,238 | B2 | 3/2011 | Fein et al. |
| 7,908,216 | B1 | 3/2011 | Davis et al. |
| 7,922,082 | B2 | 4/2011 | Muscato |
| 7,931,195 | B2 | 4/2011 | Mullen |
| 7,938,318 | B2 | 5/2011 | Fein et al. |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders et al. |
| 8,046,256 | B2 | 10/2011 | Chien et al. |
| 8,060,448 | B2 | 11/2011 | Jones |
| 8,060,449 | B1 | 11/2011 | Zhu |
| 8,074,877 | B2 | 12/2011 | Mullen et al. |
| 8,074,879 | B2 | 12/2011 | Harris |
| 8,082,210 | B2 | 12/2011 | Hansen |
| 8,095,113 | B2 | 1/2012 | Kean et al. |
| 8,104,679 | B2 | 1/2012 | Brown |
| RE43,157 | E | 2/2012 | Bishop et al. |
| 8,109,436 | B1 | 2/2012 | Hopkins, III |
| 8,121,942 | B2 | 2/2012 | Carlson et al. |
| 8,121,956 | B2 | 2/2012 | Carlson et al. |
| 8,126,449 | B2 | 2/2012 | Beenau et al. |
| 8,171,525 | B1 | 5/2012 | Pelly et al. |
| 8,196,813 | B2 | 6/2012 | Vadhri |
| 8,205,791 | B2 | 6/2012 | Randazza et al. |
| 8,219,489 | B2 | 7/2012 | Patterson |
| 8,224,702 | B2 | 7/2012 | Mengerink et al. |
| 8,225,385 | B2 | 7/2012 | Chow et al. |
| 8,229,852 | B2 | 7/2012 | Carlson |
| 8,265,993 | B2 | 9/2012 | Chien et al. |
| 8,280,777 | B2 | 10/2012 | Mengerink et al. |
| 8,281,991 | B2 | 10/2012 | Wentker et al. |
| 8,328,095 | B2 | 12/2012 | Oder, II et al. |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders et al. |
| 8,401,539 | B2 | 3/2013 | Beenau et al. |
| 8,401,898 | B2 | 3/2013 | Chien et al. |
| 8,402,555 | B2 | 3/2013 | Grecia |
| 8,403,211 | B2 | 3/2013 | Brooks et al. |
| 8,412,623 | B2 | 4/2013 | Moon et al. |
| 8,412,837 | B1 | 4/2013 | Emigh et al. |
| 8,417,642 | B2 | 4/2013 | Oren et al. |
| 8,447,699 | B2 | 5/2013 | Batada et al. |
| 8,453,223 | B2 | 5/2013 | Svigals et al. |
| 8,453,925 | B2 | 6/2013 | Fisher et al. |
| 8,458,487 | B1 | 6/2013 | Palgon et al. |
| 8,484,134 | B2 | 7/2013 | Hobson et al. |
| 8,485,437 | B2 | 7/2013 | Mullen et al. |
| 8,494,959 | B2 | 7/2013 | Hathaway et al. |

(56) References Cited

U.S. PATENT DOCUMENTS

| | | |
|---|---|---|
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,707,404 B2 * | 4/2014 | Sorotokin ............ H04L 9/3213 713/155 |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 8,959,347 B2 * | 2/2015 | Gupta ............... H04L 63/0428 713/170 |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,191,375 B2 * | 11/2015 | Kaler ............... H04L 63/0435 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,852,423 B2 * | 12/2017 | Sagady ............ G06Q 20/3829 |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0030965 A1 * | 2/2007 | Mansz ............ H04L 63/0428 380/201 |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0263645 A1 * | 10/2008 | Renter ............. G06F 21/6245 726/6 |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0076966 A1 | 3/2009 | Bishop |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |

(56) References Cited

U.S. PATENT DOCUMENTS

| | | |
|---|---|---|
| 2010/0199089 A1 | 8/2010 | Vysogorets |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0031969 A1 | 2/2012 | Hammad |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0047242 A1* | 2/2013 | Radhakrishnan ... H04L 63/0807 726/9 |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1* | 8/2013 | Mattsson ............ G06Q 20/405 705/39 |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |

(56) References Cited

U.S. PATENT DOCUMENTS

| | | |
|---|---|---|
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0136847 A1 | 5/2014 | Huang |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0026049 A1 | 1/2015 | Theurer |
| 2015/0026767 A1 | 1/2015 | Sweet |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0058227 A1 | 2/2015 | Dua |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0287030 A1* | 10/2015 | Sagady ............ G06Q 20/3829 705/71 |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0110713 A1* | 4/2016 | Howe ................ G06Q 20/401 705/75 |
| 2017/0249622 A1* | 8/2017 | Ortiz ................ G06Q 20/3221 |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sun, Hung-Min; Leu, Muh-Chyi. An Efficient Authentication Scheme for Access Control in Mobile Pay-TV Systems. IEEE Transactions on Multimedia, vol. 11, Issue: 5. https://ieeexplore.ieee.org/stamp/stamp.jsp?tp=&arnumber=5033651 (Year: 2009).*

Dizaj, Mohammad Vahid Alizadeh. New mobile payment protocol: Mobile Pay Center Protocol 4 (MPCP4) by using new Key agreement protocol: VAC2. 2011 3rd International Conference on Electronics Computer Technology. https://ieeexplore.ieee.org/stamp/stamp.jsp?tp=&arnumber=5941657 (Year: 2011).*

Lutz, David J.; Stiller, Burkhard. A Survey of Payment Approaches for Identity Federations in Focus of the SAML Technology. IEEE Communications Surveys&Tutorials, vol. 15, Issue: 4. https://ieeexplore.ieee.org/stamp/stamp.jsp?tp=&arnumber=6506140 (Year: 2013).*

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

(56) References Cited

OTHER PUBLICATIONS

Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Sirbu, M.A. Credits and debits on the Internet. IEEE Spectrum vol. 34, Issue: 2. Pub. Date: 1997. http://ieeexplore.ieee.org/stamp/stamp.jsp?tp=&arnumber=570823.
Chang, Shih-Fang. Application Marketplace as a Service: A Reference Architecture for Application Marketplace Service. 2010 International Conference on P2P, Parallel, Grid, Cloud and Internet Computing (3PGCIC). Pub. Date: 2010. http://ieeexplore.ieee.org/stamp/stamp.jsp?tp=&arnumber=5662792.
Hisamatsu, A.; Psihva, D.; Nishantha, G.G.D. Online Banking and Modern Approaches Toward its Enhanced Security. 2010 the 12th International Conference on Advanced Communication Technology (ICACT). Pub. Date: 2010. http://ieeexplore.ieee.org/document/5440305/.

\* cited by examiner

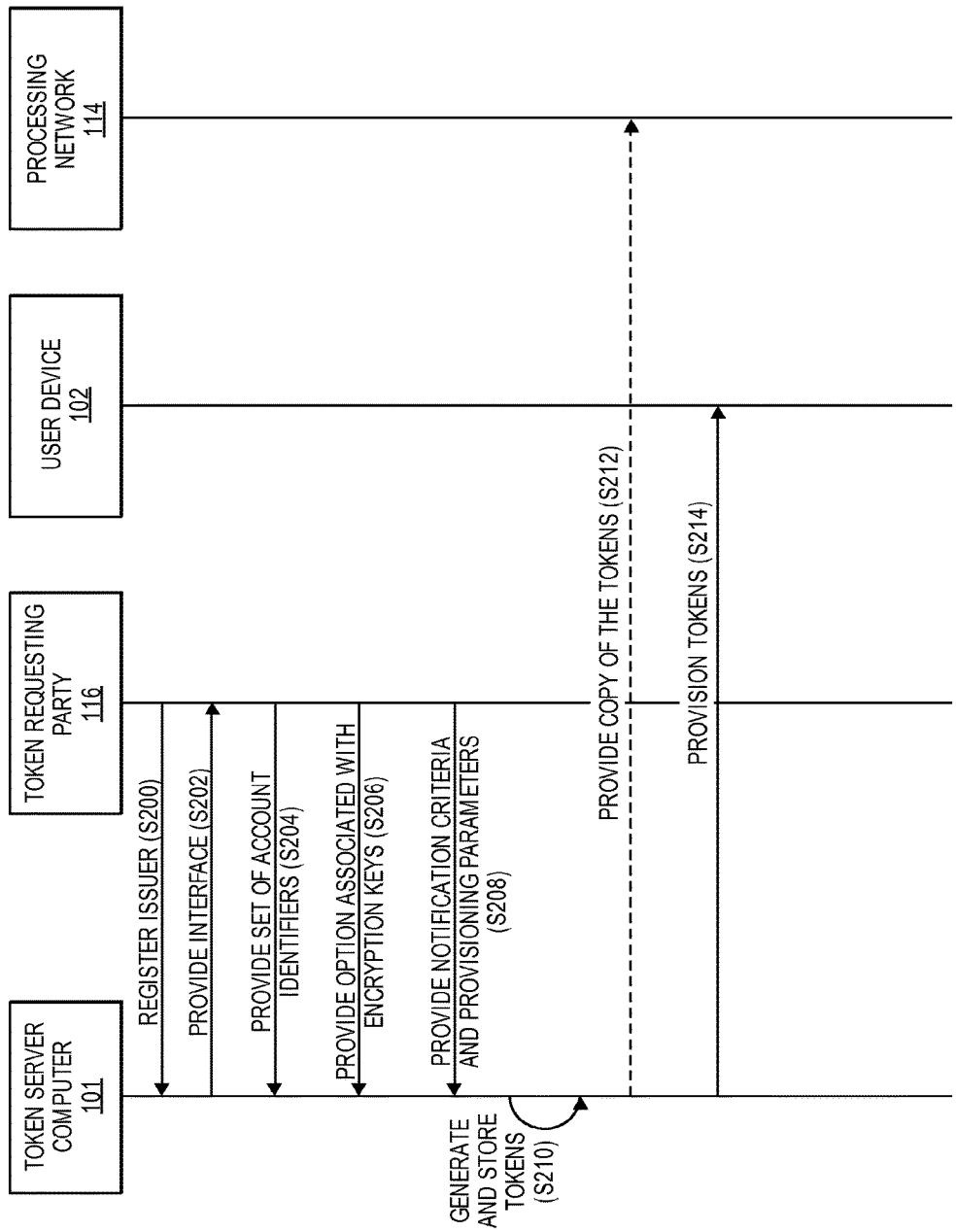

← Subscription ID 7711  Business Name First Digital National Bank  Status New                      ⓘ Help  ↓ Close

| Terms | General Information | Product Eligibility | Key Management | Provisioning Options | Processing Options | Life Cycle | Submit |

402 404 406 408 410 412 414 416

(*) mandatory fields

Declaration:*

⬇ Download Terms and Conditions for Participation in Token Service (TS), then upload the signed copy for all the selected Licensed BID(s).

For 10003321 - First Digital National Bank:

[ Browse ]  [ Upload ]

<u>420</u>

☐ I/We confirm that a signed Agreement has been provided to XYZ for th Issuer(s) being enrolled in this submission.

⬇ If a signed Agreement has not yet been submitted for the Issuer(s) being enrolled in this submission. A blank agreement can be accessed here, then upload your signed copy.

[ Browse ]  [ Upload ]

<u>422</u>

[ Save ]

←                                                                                            ⓘ Help    ← Close

Subscription ID 7711   Business Name First Digital National Bank   Status Saved

404

| Terms | General Information | Product Eligibility | Key Management | Provisioning Options | Processing Options | Life Cycle | Submit |

Please make sure to review all of your answers carefully before submitting the completed Token Service Enrollment form to XYZ. Implementation problems may occur if you fail to provide accurate information. All parameters will be equally applied to all BINs included in this request. If different parameters are required for different BINs please submit an individual request for each set of BINs. If there is anything you do not understand, please contact your Client Configuration Management (CCM) Implementation Analyst for assistance before submitting this form.

General Information: ⓘ

| | | | |
|---|---|---|---|
| Business ID: | 10003321 | Business Name: | First Digital National Bank |
| Legal Address: | New Street | City: | New City |
| State: | VA | Zip: | 22180 |
| Country: | US | | |

<u>500</u>

Endpoint Configuration

| PCR: | 3466, 4687, 4688, 6400, 7296, 8088, 9004, 9088 |

<u>502</u>

The client/processing must validate all changes in its authorization systems, and verify that changes are fully reconciled throughout the transaction cycle to clearing and settlement to ensure that transactions are being correctly processed. Any anomalies detected must be promptly reported to XYZ.

Back                          Next

FIG. 4

10003321 - First Digital National Bank 610

☐ ⊕ CREDIT

☐ ⊕ PREPAID

☐ ⊖ DEBIT

| ISO BIN | Account Number Min | Account Number Max | Licensed BID | Licensed Business Name |
|---|---|---|---|---|
| ☐ 400023 | 400023000000000 | 400023999999999 | 10003321 | First Digital National Ba... |
| ☐ 406315 | 406315000000000 | 406315999999999 | 10003321 | First Digital National Ba... |
| ☐ 406315 | 406315400000000 | 406315499999999 | 10003321 | First Digital National Ba... |
| ☐ 460847 | 460847000000000 | 460847999999999 | 10003321 | First Digital National Ba... |

612

Test PAN Numbers

614

Separate multiple PAN by comma (,)

Cancel    Save

Subscription ID 7711 Business Name First Digital National Bank Status Saved ② Help  ↓ Close

| Terms | General Information | Product Eligibility | Key Management | Provisioning Options | Processing Options | Life Cycle | Submit |

Key Management:* ⓘ

XYZ requires a Master Derivation Key (MDK) to provision a device on behalf of your cardholders.

I/We agree for XYZ to create a Master Derivation Key (MDK) for Chip based token transaction processing   ○ Yes  ● No Will you be using an existing Master Derivation Key (MDK) currently on file with XYZ?   ○ Yes  ● No Please provide the Master Derivation Key values below:

Zone Control Master Key (ZCMK): [____712____]  MDK Set A: [____713____]

ZCMK Key Check Value (KCV): [____714____]  MDK Set B: [____715____]

Sequence #: [____716____]  MDK Key Check Value: [____717____]

Derivative Key Index (DKI): [____718____]

NOTE: Only the index can be setup for token provisioning per BIN.

(*) mandatory fields

Back    Save

Subscription ID 7711 Business Name First Digital National Bank Status Saved

[ Terms ] [ General Information ] [ Product Eligibility ] [ Key Management ] [ Provisioning Options ] [ Processing Options ] [ Life Cycle ] [ Submit ]

408

⊙ Help  ← Close

720

Key Management:* ⓘ

(*) mandatory fields

XYZ requires a Master Derivation Key (MDK) to provision a device on behalf of your cardholders.

I/We agree for XYZ to create a Master Derivation Key (MDK) for Chip based token transaction processing  ● Yes  ○ No  — 721

Will you be using an existing Master Derivation Key (MDK) currently on file with XYZ?  ○ Yes  ● No Should XYZ use internal Zonal Control Master Key (ZCMK) to create this key?

Sequence #: [_____] — 722

Derivative Key Index (DKI): [_____] — 724

Zone Control Master Key (ZCMK): [_____] — 726

ZCMK Key Check Value (KCV): [_____] — 728

NOTE: If a new ZCMK is required, complete th Key Management Request Form.

Back                                                                                    [ Save ]

Subscription ID 7711 Business Name First Digital National Bank Status Saved  ⓘ Help  ← Close

| Terms | General Information | Product Eligibility | Key Management | Provisioning Options | Processing Options | Life Cycle | Submit |

408

Key Management:* ⓘ

(*) mandatory fields

XYZ requires a Master Derivation Key (MDK) to provision a device on behalf of your cardholders.

I/We agree for XYZ to create a Master Derivation Key (MDK) for Chip based token transaction processing     ●Yes  ○No NOTE: XYZ will set up unique keys for each BIN.

Should XYZ use internal Zonal Control Master Key (ZCMK) to create this key?     ●Yes  ○No XYZ will create the Master Derivation Keys, however XYZ will not provide them to you. Should you need a copy of these keys in the future, submit a Master Derivation Key Re-translation request.

Back                    Save

Subscription ID 7711 Business Name First Digital National Bank Status Saved        ⓘ Help    ✖ Close

| Terms ⊘ | General Information ⊘ | Product Eligibility ⊘ | Key Management ⊘ | Provisioning Options | Processing Options | Life Cycle | Submit |

— 414

1000

Life Cycle Management (LCM) Connectivity for Tokens:

I/We agree that the selected entity will use the Life Cycle Management service for tokens through XYZ Online (OL).
Please select all that apply:*
☐ Bin Owner
☐ Authorized Processors
☐ Others Request LCM application access for existing OL users from the selected entities by listing their user ID below:

[                    ]
       |
     1002

Separate multiple user IDs by comma(,).
Don't have OL ID? *Submit a new OL user request.*

Back                                                                    Save

FIG. 9

← 　　　　　　　　　　　　　　　　　　　　　　　　　　　? Help　↓ Close

Subscription ID 7711 Business Name First Digital National Bank Status Submitted　　　1100

| Terms ⊘ | General Information ⊘ | Product Eligibility ⊘ | Key Management ⊘ | Provisioning Options ⊘ | Processing Options ⊘ | Life Cycle ⊘ | Submit |

1102　　　　　　416　　　　　(*) mandatory fields

Licensing Requirements:*

By submitting this request, we acknowledge and accept full responsibility for any and all activities associated with the use of this routing ID and that this agreement is governed by and subject to the XYZ International Operating Regulations.

I agree with the licensing requirements as stated above　　　　● Yes ○ No　　1104

Setup Date:

Estimated date for completion of setup:  02 December 2014   1106

NOTE: XYZ's standard daily global load process is generally finished by 8:00 AM ET. Although this load process generally completes around this time, there may be circumstances when the process will be completed later than the time specified. In the event of significant delay in timing of the daily global load, XYZ will notify clients/endpoints of when the anticipated changes will be completed.

NOTE: production validation can occur 1 to 2 weeks prior to an issuer's estimated live data. Not all issuer programs will be selected for production validation. Factors for selection of a program for production validation include use of issuer supplied custom card art, issuer provided T&Cs, and processor platform. For additional information please review the Token Service-Production Validation Process Document.

Back

FIG. 10

TOKEN ENROLLMENT SYSTEM AND METHOD

RELATED APPLICATIONS

This application is a continuation application of U.S. application Ser. No. 14/920,618, filed Oct. 22, 2015, now U.S. Pat. No. 10,015,147, issued Jul. 3, 2018, which claims the benefit of and priority to U.S. Provisional Application No. 62/067,336, filed Oct. 22, 2014, the entire content of which is incorporated herein by reference for all purposes.

BACKGROUND

In a traditional electronic payment transaction, a consumer's primary account number is exposed to various entities involved during a transaction lifecycle. The account number is passed from a merchant terminal, to an acquirer system, a payment processing network, payment gateways, etc. Because the actual account number can be exposed at various points in the transaction lifecycle, payment "tokens" have been developed to conduct payment transactions. A payment token serves as an additional security layer to the account number and in effect becomes a proxy/surrogate to the actual account number. Thus, the payment token may be used in place of account number while submitting transactions. The use of payment tokens instead of account numbers can reduce the risk of fraudulent activity since the real account number is not exposed.

In conventional systems, a token service provider generates and manages the tokens. The token service provider may be the same entity as a transaction processing network. The token service provider may generate tokens for the account numbers issued by different issuers (e.g. banks) and store the tokens along with corresponding account numbers at a token vault. However, the conventional systems do not allow the issuers or other token requesting parties (e.g. token requestors) to customize or control the token generation process based on the requirements or preferences of the token requestors. Currently, only the token service provider may control the token generation process. Accordingly, token requestors are discouraged from participating in the token service because they cannot adequately oversee the token generation process.

Embodiments of the present invention solve these problems and other problems, individually and collectively.

BRIEF SUMMARY

Embodiments of the present invention enable a token requesting party (e.g. a token requestor) to control and customize the token generation process of a token service provider. The token requesting party may specify parameters to the token service provider for use during token generation. For example, the token requesting party may specify the accounts for the tokens to be generated, encryption keys for the tokens and threshold for generation of notifications associated with the tokens, among other parameters.

According to embodiments, tokens may be generated as a proxy for any information associated with the account, such as, account identifying number, account holder name, address, account holder identification number, account holder position in an organization, etc. Tokens may be generated for payment transactions (e.g. payment tokens) or for access transactions (e.g. access tokens). If the tokens are generated for payment transactions, the token requesting party may include an issuer, an acquirer, a merchant, a bank, a cardholder, a payment processing network, etc.

According to various embodiments, a token requesting party may register with the token service provider to benefit from tokenization services offered by the token service provider. The token service provider may be the same as a transaction processor (e.g. a transaction processing network). The token service provider may be associated with a token server computer to provide an online portal and/or a website for registering a token requesting party. The online portal may also serve as an interface to allow the token requesting party to interact with the one or more modules of the token server computer for controlling and customizing the generation of the tokens. The modules may include, but are not limited to, a key management module, a provisioning module, a notification module and a risk management module. The token server computer may further include a token vault to store the generated tokens and the mapping between the tokens and the account information represented by the tokens.

According to an embodiment, a method performed by a token server computer operated by a token service provider includes providing, an interface to a party. The party controls generation of tokens for account identifiers via the interface. The method also includes receiving a set of account identifiers from a computer operated by the party via the interface. The method further includes receiving a selection of an option associated with encryption keys from the computer operated by the party via the interface. The method includes determining tokens based on the option associated with the encryption keys. A token associated with at least one encryption key is determined for each account identifier of the set of account identifiers. The method also includes storing the tokens and associated encryption keys for later use in token transaction processing.

In some embodiments, the method also includes receiving a notification criteria from the computer operated by the party via the interface, and sending a notification to the computer operated by the party when a token satisfies the notification criteria. The notification criteria includes generation of the token or provisioning of the token. The method may also include receiving a restriction to be placed on one or more of the generated tokens from the computer operated by the party via the interface.

In some embodiments, the option associated with the encryption keys instructs using one or more encryption keys provided by the party. In other embodiments, the option associated with the encryption keys instructs using one or more encryption keys generated by the token server computer.

In some embodiments, receiving the set of account identifiers from the computer operated by the party further comprises presenting a list of a plurality of account identifiers via the interface, and receiving a selection of the set of account identifiers on the list of the plurality of account identifiers from the computer operated by the party via the interface. In other embodiments, receiving the set of account identifiers from the computer operated by the party further comprises receiving a file containing the set of account identifiers from the computer operated by the party via the interface.

In some embodiments, the method may also include receiving provisioning parameters for the generated tokens via the interface. The provisioning parameters include one or more of risk decision rules, design elements or provisioning conditions. The method may further include provisioning the generated tokens on user devices based on the provisioning parameters.

Another embodiment is directed to apparatuses, systems, and computer-readable media configured to perform the methods described above.

These and other embodiments are described in further detail below.

BRIEF DESCRIPTION OF THE DRAWINGS

FIG. 2 illustrates a flowchart for token generation process controlled by a token requesting party, in accordance with some embodiments of the invention.

FIG. 3 illustrates a screenshot of a user interface providing the terms for controlling and customizing the token generation process, in accordance with some embodiments of the invention.

FIG. 4 illustrates a screenshot of a user interface providing the general information of the token requesting party that is controlling and customizing the token generation process, in accordance with some embodiments of the invention.

FIG. 5B illustrates a screenshot of a user interface for receiving a selection of account ranges by the token requesting party, in accordance with some embodiments of the invention.

FIG. 6A illustrates a screenshot of a user interface for receiving information regarding encryption keys associated with tokens according to a first option, in accordance with some embodiments of the invention.

FIG. 6B illustrates a screenshot of a user interface for receiving information regarding encryption keys associated with tokens according to a second option, in accordance with some embodiments of the invention.

FIG. 6C illustrates a screenshot of a user interface for receiving information regarding encryption keys associated with tokens according to a third option, in accordance with some embodiments of the invention.

FIG. 6D illustrates a screenshot of a user interface for receiving information regarding encryption keys associated with tokens according to a fourth option, in accordance with some embodiments of the invention.

FIG. 7 illustrates a screenshot of a user interface for receiving provisioning options selected by the token requesting party, in accordance with some embodiments of the invention.

FIG. 8 illustrates a screenshot of a user interface for receiving processing options selected by the token requesting party, in accordance with some embodiments of the invention.

FIG. 9 illustrates a screenshot of a user interface for receiving lifecycle management options selected by the token requesting party, in accordance with some embodiments of the invention.

FIG. 10 illustrates a screenshot of a user interface for finalizing the enrollment in the token service, in accordance with some embodiments of the invention.

DETAILED DESCRIPTION

Figure 1:
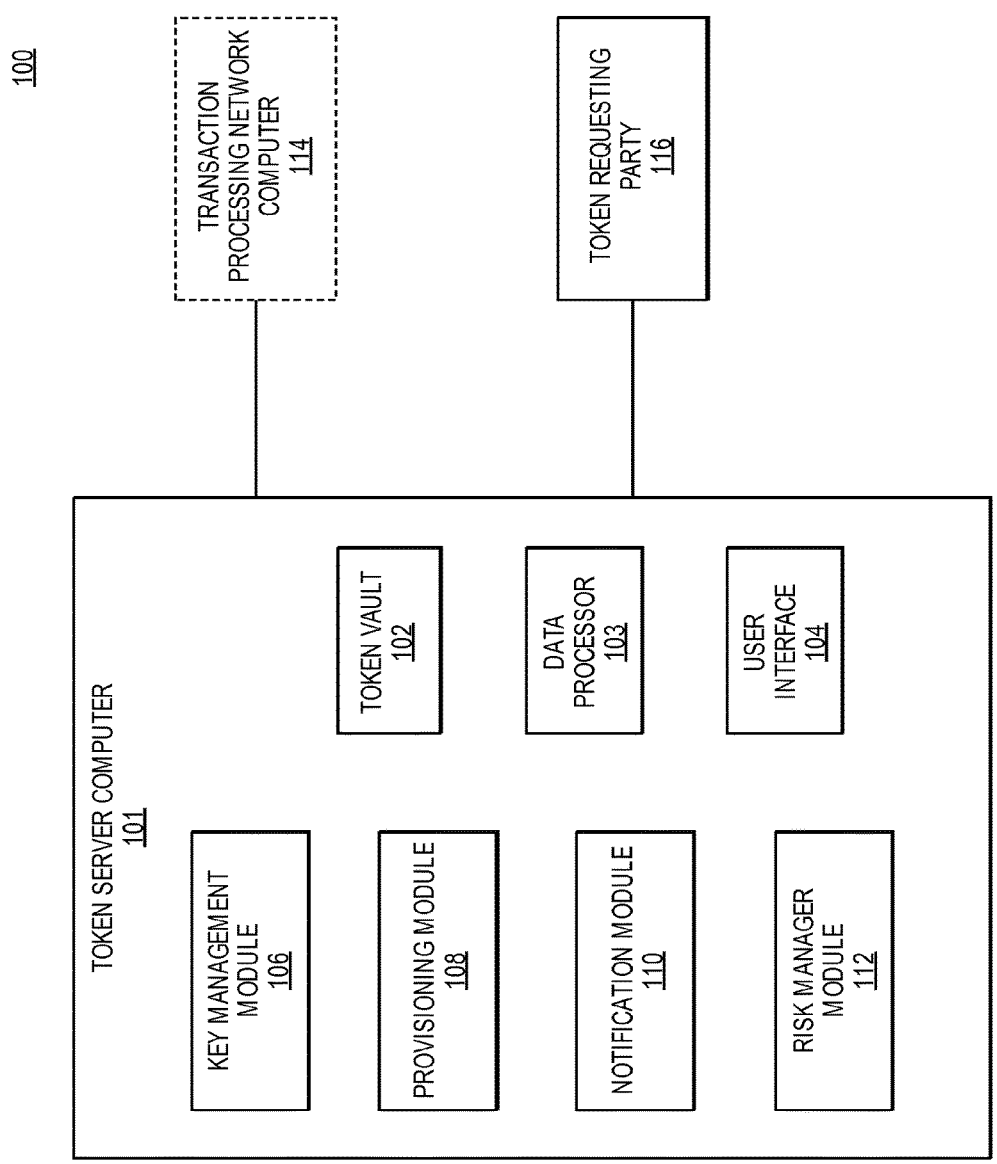
FIG. 1 shows a block diagram of a tokenization system including a token server computer, in accordance with some embodiments of the invention.

Embodiments of the invention are directed to methods, apparatuses, computer readable media and systems for providing a token service environment that allows a token requesting party (e.g. token requestor) to specify parameters for token generation to control and customize the token generation process. For example, the token requesting party may specify (e.g. select from a list or provide a list of) the accounts for tokenization. The accounts may be identified by account identifiers (e.g. account numbers) or bank identification numbers (BINs). The token requesting party may also specify encryption keys for the tokens to be generated. The token requesting party may also specify additional parameters such as notification thresholds indicating when notifications associated with the tokens are to be generated.

According to various embodiments, tokens may be generated for payment transactions (e.g. payment tokens) or for access transactions (e.g. access tokens). For access transactions, the tokens may be used to access a physical structure (e.g. a building) or a virtual location (e.g. a webpage, a database stored on a server, etc.). If the tokens are generated for payment transactions, the token requesting party may include an issuer, an acquirer, a merchant, a bank, a cardholder, a payment processing network, etc.

According to various embodiments, the token requesting party may register with the token service provider to benefit from tokenization services (e.g. to enroll in the token service) offered by the token service provider. In some embodiments, the token service provider may be managed or provided by a transaction processing network (e.g. a payment processing network). The token service provider may include an online portal and/or website for registering the token requesting party. The online portal may serve as an interface to allow the token requesting party to interact with the one or more modules of a token server computer of the token service provider. The token requesting party may control and customize the token generation process through the modules of the token server computer. The token server computer may further include or communicate with a token vault to store the generated tokens, encryption keys associated with the tokens and the mapping between the tokens and the account information represented by the tokens.

As discussed in further detail below, various parties in a tokenization environment (e.g. an account holder, an issuer, an acquirer, a merchant, a payment processor, etc.) may provide various types of information in order to be able to use a token vault managed and/or operated by a token service provider. Embodiments provide a system which, in combination, allows a token requesting party to 1) specify accounts for tokenization, 2) specify encryption keys associated with the generated tokens, and 3) configure notification thresholds associated with the generation, provisioning and use of the tokens. According to various embodiments, the token requesting party may customize additional parameters associated with the token generation process such as identifying the party that will manage the tokens once the tokens are generated, how the tokens will be processed during a tokenized transaction and/or card metadata for an identification card that may be generated for the tokenized account.

Before discussing specific embodiments and examples, some descriptions of terms used herein are provided below.

A "token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "key" may refer to a piece of information that is used in a cryptographic algorithm to transform input data into another representation. An exemplary encryption key may include a master derivation key (MDK) which may be used to generate a limited use key (LUK) that is provided to a computer device of a user. An LUK can be an encryption key that is intended for limited use (e.g., a limited number of transactions or a limited time period) and is not intended to be used for the lifetime of an account. Further details regarding LUKs can be found in U.S. Published Patent Application No. 2015/0180836, which is herein incorporated by reference in its entirety and is assigned to the same assignee as the present application. The MDK may be used to generate and provision the token, as well as, authenticate the token when used in authorization processing by validating static and variable transaction data.

A "key check value (KCV)" may refer to value obtained by passing a data value through a non-reversible algorithm. The key check value may be calculated using a cryptographic algorithm which takes as input a secret key and an arbitrary string, and which gives a cryptographic check value as output. The computation of a correct check value without knowledge of the secret key is not feasible.

A "zone control master key (ZCMK)" may refer to a key encryption key that is shared between the parties in the transaction environment such as the acquirer, the issuer, etc. which may be used to encrypt working keys shared between these parties. The ZCMK may be used to encrypt other encryption keys for transport and may not be used for encrypting data, such as transaction data or account holder identifying data.

A "cryptographic algorithm" can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. Encryption techniques may include symmetric and asymmetric encryption techniques.

A "Bank Identification Number (BIN)" may be assigned by a payment processing network to an issuer of a payment account. BINs may be consistent with industry account and issuer identification specifications (e.g. ISO 7812) such that the payment processing network assigning the BIN may be identified based on the BIN and associated account ranges. Similarly, the issuer of the payment account may be identified based on the BIN assigned to the issuer by the payment processing network.

In some embodiments, the token format may allow entities in the payment system to identify the issuer associated with the token. For example, the format of the token may include a token issuer identifier that allows an entity (e.g. the payment processing network) to identify an issuer of the token. For instance, the token issuer identifier may be associated with an issuer's BIN of the underlying PAN in order to support the existing payment flow. The token issuer identifier may be a different number than the issuer's BIN and may be static. For example, if the issuer's BIN for an issuer is 412345, the token issuer identifier may be 528325 and this number may be static for all tokens issued from or for that issuer. In some embodiments, the token issuer identifier range (e.g., issuer BIN range) may have the same attributes as the associated issuer card range and can be included in an issuer identifier routing table (e.g., BIN routing table). The issuer identifier routing table may be provided to the relevant entities in the payment system (e.g., merchants and acquirers).

A "token BIN" may refer to a specific BIN that has been designated only for the purpose of issuing tokens and may be flagged accordingly in BIN tables. Token BINs may not have a dual purpose and may not be used to issue both primary account numbers (PANs) and tokens.

A "token issuer identifier range (issuer BIN range)" may refer to a unique identifier (e.g., of 6 to 12 digits length) originating from a set of pre-allocated token issuer identifiers (e.g., 6 digit token BINs). In some embodiments, the token BIN ranges may be used to generate a payment token. In some embodiments, a token may pass the basic validation rules of an account number including, for example, a LUHN check or checksum validation that may be set up by different entities within the payment system. In some embodiments, a payment token issuer identifier may be mapped to a real issuer identifier (e.g., a BIN) for an issuer. For example, a payment token issuer identifier may include a six digit numerical value that may be associated with an issuer. For instance, any token including the payment token issuer identifier may be associated with a particular issuer. As such, the issuer may be identified using the corresponding issuer identifier range associated with the token issuer identifier. For example, a payment token issuer identifier "490000" corresponding to a payment token "4900 0000 0000 0001" can be mapped to an issuer identifier "414709" corresponding to a payment account identifier "4147 0900 0000 1234". In some embodiments, a payment token issuer identifier is static for an issuer. For example, a payment token issuer identifier (e.g., "490000") may correspond to a first issuer and another payment token issuer identifier (e.g., "520000") may correspond to a second issuer, and the first and second payment token issuer identifiers may not be changed or altered without informing all entities within the transaction processing system. In some embodiments, a payment token issuer identifier range may correspond to an issuer identifier. For example, payment tokens including payment token issuer identifiers from "490000"-"490002" may correspond to a first issuer (e.g., mapped to issuer identifier "414709") and payment tokens including payment token issuer identifiers from "520000"-"520002" may correspond to a second issuer (e.g., mapped to real issuer identifier "417548"). Token BIN Ranges and assignment of tokens from these BIN ranges may be made available to the parties accepting the transaction to make routing decisions.

A "token vault" may refer to a repository that maintains established token-to-account identifying number mappings. For example, the token vault may maintain one-to-one mapping between a token and an account identifying number represented by the token. Token vaults, due to the sensitive nature of the data mappings that are stored and managed in them, may be protected by strong underlying physical and logical security.

"Provisioning" may include a process of providing data for use. For example, provisioning may include providing, delivering, or enabling a token on a device. Provisioning may be completed by any entity within or external to the transaction processing system. For example, in some embodiments, tokens may be provisioned by an issuer or a payment processing network onto a mobile device of a consumer (e.g. account holder). The provisioned tokens may have corresponding token data stored and maintained in the token vault or token registry.

"Tokenization" is a process by which data is replaced with substitute data. For example, an account identifier may be tokenized by replacing the primary account identifier with a substitute number (e.g. a token) that may be associated with the account identifier. Further, tokenization may be applied to any other-information which may be replaced with a substitute value (i.e., token). Tokenization may be used to enhance transaction efficiency, improve transaction security, increase service transparency, or to provide a method for third-party enablement.

"Token exchange" or "de-tokenization" is a process of restoring the data that was substituted during tokenization. For example, a token exchange may include replacing a token with a corresponding account number that was associated with the token during tokenization of the account number. Thus, the de-tokenization may refer to the process of redeeming a token for the associated account number value based on a token-to-account number mapping stored, for example, in a token vault. The ability to retrieve an account number in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

"Token Processing" may refer to transaction processing in which a token is present in lieu of the account number. The token is processed from the point of interaction throughout the network. The token processing further includes using the token vault for de-tokenization of the token in order to complete the transaction.

A "consumer" may include an individual or a user that may be associated with one or more personal accounts and/or consumer devices. The consumer may also be referred to as a cardholder, account holder, or user.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

An "issuer" can include an account issuer. The account (which may be associated with one or more devices) may refer to any suitable account including a payment account (e.g. credit card account, a checking account, a savings account, a merchant account assigned to a consumer, or a prepaid account), an employment account, an identification account, an enrollment account (e.g. a student account), etc.

A "processing network" may include an electronic system used to accept, transmit, or process transactions made by devices. The processing network may transfer information among transacting parties (e.g., issuers, acquirers, merchants, device users, etc.).

FIG. 1 illustrates an exemplary tokenization environment 100 including a token server computer 101 of a token service provider. The token server computer 101 may be in communication with a token requesting party 116. The token requesting party 116 may operate a token requesting party computer. In some embodiments, the token server computer 101 may also be in communication with a transaction processing network computer 114 (e.g., a payment processing network computer). In other embodiments, the token server computer 101 may part of the transaction processing network.

The token server computer 101 may be responsible for provisioning a token to a specific user device of an account holder using a provisioning module 108 in conjunction with a data processor 103. Provisioning may include creating a token within a token vault 102 for an account, sending the token to the token requesting party 116 and sending the token to a device of the account holder.

According to embodiments directed to payment transactions, the token requesting party 116 may be an account holder, a payment processing network, an issuer, an acquirer and/or a merchant. Embodiments discussed below are directed to the token requesting party 116 being an issuer or a third party acting on behalf of the issuer. However, embodiments of the invention are not restricted to a token requestor that is an issuer.

In some embodiments, the token requesting party 116 may register with the token server computer 101 using an online portal or a website of the token server computer 101. The online portal or the website may provide a user interface 104 to allow the token requesting party 116 to interact with the token server computer 101 to control the token generation process.

Using the user interface 104, the token requesting party 116 may request the token server computer 101 to generate one or more tokens for a plurality of accounts issued, owned and/or managed by the token requesting party 116. The token requesting party 116 (e.g. a computer operated by the token requesting party) may provide a set of account identifiers to the token server computer 101. The token server computer 101 may generate (or determine) a token for each one of the account identifiers received from a computer operated by the token requesting party 116. The generated tokens may be stored at a token vault 102. The token vault 102 may also store a mapping between each token and the account identifier identifying the account represented by the token. The token vault 102 may also be used by the transaction processing network computer 114 to de-tokenize the token and convert the token to the account number represented by the token when a transaction authorization is processed through the transaction processing network computer 114. The token vault 102 may also manage all domain restrictions associated with each token provisioned.

The token requesting party 116 may also select, with the data processor 103 executing the key management module 106 of the token server computer 101, an option associated with encryption keys. For example, the token requesting party 116 may choose to provide the encryption keys to the token server computer 101 via the key management module 106. In some embodiments, the token requesting party 116 may choose to leave the key generation to the token server computer 101. The token server computer 101 may generate (or determine) the tokens based on the option associated with the encryption keys. The token server computer 101 may generate a token associated with at least one encryption key for each account identifier of the set of account identifiers. The token server computer 101 may store the encryption keys along with the associated tokens in the token vault 102. The encryption keys may then be provided to a user device of the account holder. The tokens and corresponding encryption keys may be used in tokenized transactions processed by the transaction processing network computer.

The token requesting party 116 may also initiate a request to receive a message when a token has been generated and/or provisioned for one of the accounts associated with the token requesting party 116. The token requesting party 116 may specify notification criteria via the user interface 104. The token server computer 101 may generate a notification using the data processor 103 executing code in the notification module 110 based on the notification criteria (e.g. when a token satisfies the notification criteria) provided by the token requesting party 116. It may also send the notification to the token requesting party 116. For example, the token requesting party 116 may request a notification when a token is generated. The notification module 110 of the token server computer 101 may generate and send a notification to the token requesting party 116 when the token is generated. Similarly, the token requesting party 116 may request a notification when a token is provisioned on a user device. The notification module 110 of the token server computer 101 may generate and send a notification to the token requesting party 116 when the token is provisioned on the user device. For example, the notification module 110 may be informed by the provisioning module 108 that the token has been provisioned on the user device.

The token server computer 101 may also include a risk management module 112 that can work in conjunction with the data processor 103 to set up rules for risk decisioning when the token server computer 101 receives the token provisioning request from the token requesting party 116. As part of further customization of the token generation process, the token requesting party 116 may indicate rules for provisioning or processing the token based on a risk assessment associated with a transacting party, a device used in the transaction, or the account itself. In some embodiments, the token requesting party 116 may provide a restriction that is placed on one or more of the generated tokens based on the risk decisioning rules.

The token server computer 101 shown in FIG. 1 is provided for illustration purposes and should not be construed as limiting. The token server computer 101 may include more or less components than those illustrated in FIG. 1. For example, the token server computer 101 may include additional software modules, such as a processing module, a lifecycle management module, etc. These and other modules may, in conjunction with the data processor 103, allow the token server computer 101 to perform one or more of the following functions: map an account identifier to a token and store the mapping in the token vault with relevant domain restrictions; provision a token from the token vault to a user device; manage (e.g., delete, suspend, resume, etc.) the token both at the token vault and on the user device; generate encryption keys based on the token requesting party's request; manage encryption keys based on predetermined criteria; process tokenized transactions including performing cryptogram validation, domain restriction checks, and validity checks; and perform post-transaction verification processing to verify that transactions and account updates are conducted on the user device after the transaction is processed by the transaction processing network.

In some embodiments, the token server computer 101 may support contactless payment use cases. This includes support for contactless payment methods using a secure element and Host Card Emulation (HCE)-based payment applications.

The token generation process controlled by a token requesting party is discussed next referring to the flowchart illustrated in FIG. 2.

At step S200, the token requesting party 116 may register with an online portal or website of the token server computer 101 in order to interact with the token server computer 101. The registration may provide the token requesting party 116 with secure access to important content and services provided by the token server computer 101. Each request that the token requesting party 116 creates to submit information for token generation may be called a "subscription". Accordingly, a token requesting party 116 may have one or more registered subscriptions with the token server computer 101. The token requesting party 116 may organize their subscriptions by portfolios. For example, the token requesting party 116 may use one subscription to manage tokens for payment accounts, and another subscription to manage tokens for employment accounts. The types of tokens managed by each subscription may further be defined such as all credit accounts may be managed by one subscription and all debit accounts may be managed by another subscription. A given subscription may be used to access both secure element-based and HCE-based form factors, because both of these services may be supported by the token server computer 101.

At step S202, the token server computer 101 may provide the user interface 104 to the token requesting party 116 as part of the registration process. During the registration, the user interface 104 may allow the token requesting party 116 to view the status of their existing subscriptions, and sort or filter the list of subscriptions. The status of a subscription can be (1) "new" if the token requesting party 116 started creating a new subscription (in some embodiments, the initial status of subscriptions may always be "new"); (2) "saved" to indicate that the subscription information is saved but has not been submitted yet, information can be changed or added to the subscription; (3) "submitted" for subscriptions where all the enrollment steps have been completed and the subscription is ready to be processed by the token service provider; (4) "in progress" to indicate that the token requesting party 116 submitted the subscription request and the token service provider's systems are being set up; (5) "completed" for subscriptions that are processed by the token service provider; and (6) "deleted" to indicate that the subscription has been deleted by the system administrator of the token service provider.

The user interface 104 may provide a subscription management screen to allow the token requesting party 116 to view its subscriptions. When the token requesting party 116 creates a new subscription, the token server computer 101 automatically assigns an incremental subscription ID number to track the progress of the subscription. If the token requesting party 116 has multiple subscriptions, the token requesting party 116 can filter the subscription list by entering criteria in a filter results field. According to exemplary embodiments, the subscription list may be filtered numerically (e.g. using subscription ID numbers or date) or alphabetically.

During the registration process, the token requesting party 116 may be asked to acknowledge the terms and conditions for participating in the token service provided by the token server computer 101. FIG. 3 illustrates a screenshot 400 of a user interface 104 (which could also be present on the computer operated by the token requesting party 116) providing the terms for controlling and customizing the token generation process. The user interface 104 may provide multiple tabs 402-416 that the token requesting party should navigate to provide information to customize the token generation process. Each tab is discussed below in connection with a corresponding figure.

The first tab 402 may be the terms tab where the token requesting party 116 may be asked to upload a signed copy off the term and conditions document 420. The token requesting party 116 may also be asked to upload a signed copy of the service participation agreement 422 to express legal consent to participate in the token service provided by the token server computer 101. This step may be used to support both secure element-based and other HCE-based payment form factors. The token requesting party 116 can download a blank copy of the terms and conditions document as well as the service participation agreement, sign a physical copy of the documents and upload a digital copy of the signed documents to the token vault 102. The token requesting party 116 may be required to upload the signed documents only when it creates a first subscription. All subscriptions the token requesting party 116 creates thereafter may not require the legal consent documents, as it is inferred that the agreement uploaded on the first subscription applies to all subsequent subscriptions.

The user interface may also include a second tab, the general information tab 404. FIG. 4 illustrates a screenshot of a user interface providing the general information 500 of the token requesting party. The "General Information" tab 404 may not require any action from the token requesting party. Its main purpose is to ensure that the token requesting party is providing information in the other tabs for the right organization. This tab is for the token requesting party's reference, and displays general information about the organization, including a business ID, name and address.

Figure 5A:
FIG. 5A illustrates a screenshot of a user interface providing the product eligibility for controlling and customizing the token generation process, in accordance with some embodiments of the invention.

Referring back to FIG. 2, at step S204, the token requesting party 116 may provide a set of account identifiers to the token server computer 101 for tokenization. FIG. 5A illustrates the third tab, the product eligibility tab 406, showing a screenshot 600 providing two options for the token requesting party 116 to provide account identifiers: (1) by selecting the account identifiers on the user interface (option 602), or (2) by uploading a file containing the account identifiers (option 604).

According to option 602, the token requesting party 116 may select from a list of account identifiers displayed by the token server computer 101 via the user interface 104. FIG. 5B illustrates a screenshot 610 providing a plurality of account identifier ranges 612 that can be selected by the token requesting party 116 for tokenization. Each account identifier range may include a plurality of account identifiers identifying a plurality of accounts. The screenshot 610 of the user interface may also include a window for the token requesting party to provide test account numbers.

According to option 604, the token requesting party 116 may provide a list of account identifiers (e.g., stored on a file) to token server computer 101. A file template may be available for download when the token requesting party 116 selects the option to provide a list of the account identifiers to the token server computer 101. The token requesting party 116 may download the template, fill in the information, and upload the file.

The account identifiers identify the accounts that the token requesting party 116 would like to be tokenized (e.g. tokens will be generated for the set of account identifiers provided by the token requesting party 116). An account identifier selected under a first subscription of the token requesting party 116 may not be eligible for tokenization under a second subscription of the token requesting party 116 to prevent from assigning multiple tokens to a single account identifier. In some embodiments, the token requesting party 116 may provide a range of account identification numbers (e.g. Bank Identification Numbers (BINs) or account ranges) that are eligible for tokenization. The token server computer 101 may use this information to determine whether an account identified by an account identifier is eligible for tokenization when a token provisioning request is received. If the identified accounts are eligible for tokenization, the token server computer 101 assigns tokens to the accounts and generates a mapping between each token and corresponding account identifier.

According to various embodiments, the token server computer 101 may require an encryption key (e.g. a Master Derivation Key (MDK)) to generate and provision a token. The MDK is used to generate and provision the token, as well as to authenticate the token when the token is used in authorization processing by validating static and variable transaction data. Encryption keys may be required for both secure element-based and other HCE-based payment form factors.

Referring back to FIG. 2, at step S206, the token requesting party 116 may select an option regarding how the encryption keys associated with the tokens will be provided. According to various embodiments, the encryption key may be a master derivation key (MDK). For payment transactions where the token requesting party 116 is an issuer, the issuer may use a dedicated set of keys (e.g., MDKs) per bank identification number (BIN) range or per primary account number (PAN) range for cloud-based payment transactions in order to avoid situations where the same keys are used for both secure element based and cloud-based transactions. An MDK can be used as a base key to generate limited use keys that are provided to account holder's device.

Figure 6A:
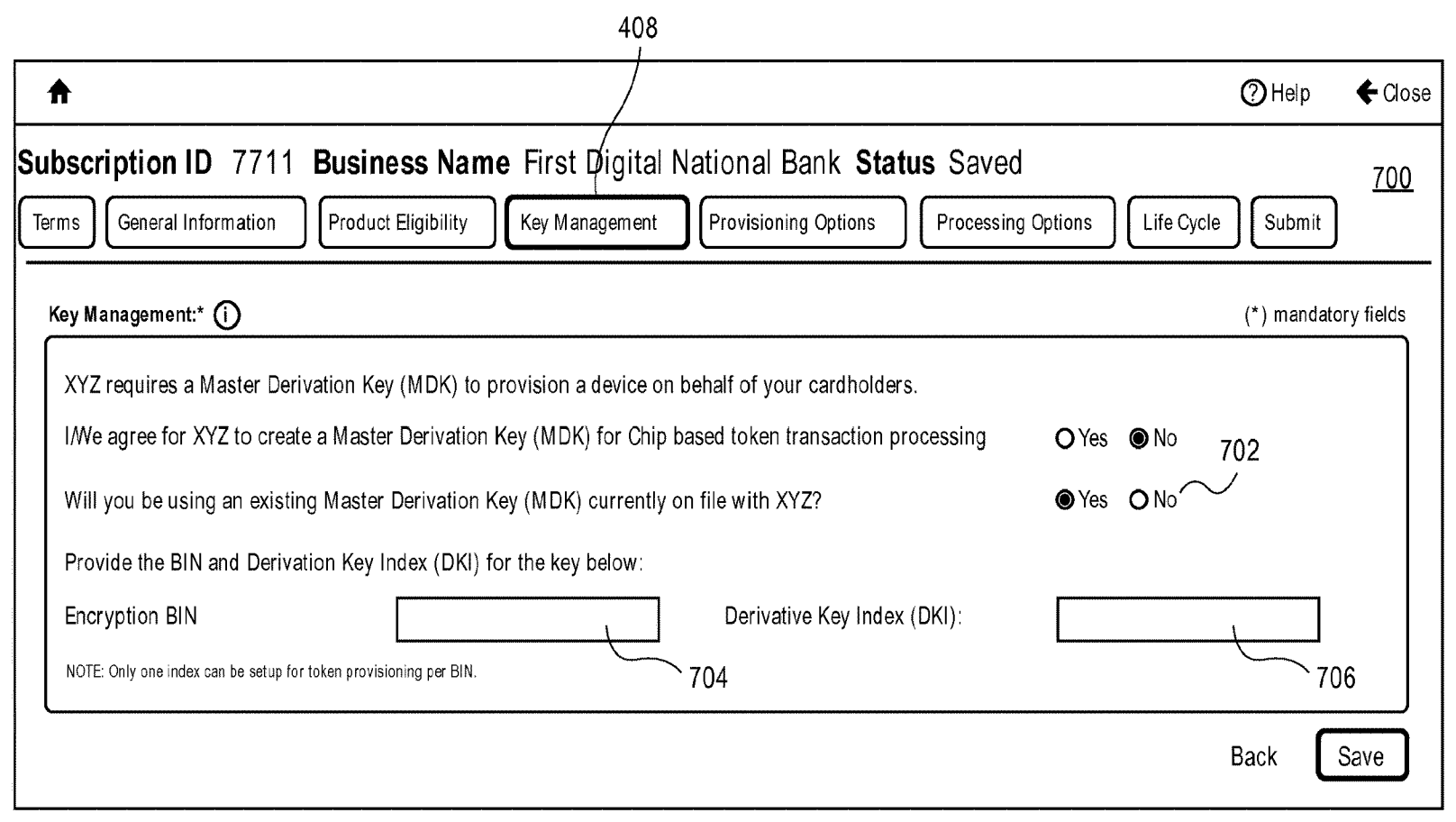

The token requesting party 116 may select one of the four options for providing the encryption keys under the key management tab 408 of the user interface. According to a first option, the token requesting party 116 may choose to use existing encryption keys which may already be stored by the token server computer 101, as illustrated in the screenshot 700 provided in FIG. 6A. If the token requesting party 116 choses to use the existing encryption keys as indicated by the selection of corresponding graphical element 702, the token requesting party 116 may be asked to provide information (e.g. encryption BIN and derivative key index) associated with the keys to ensure that correct encryption keys will be retrieved from storage and associated with the generated tokens. The user interface may provide a dedicated window to receive the required information. For example, the user interface may provide an encryption BIN window 704 and a derivative key index window 706 to receive the information.

According to a second option, the token requesting party 116 may create new encryption keys and share the new keys with the token server computer 101, as illustrated in the screenshot 710 provided in FIG. 6B. The token requesting party 116 may provide the new encryption key information using the fields provided by the user interface. For example, the token requesting party 116 may provide the zone control master key (ZCMK) (e.g. a key encryption key) at field 712, MDK set A at field 713, the ZCMK key check value (KCV) (e.g. a cryptographically secure hash of the ZCMK) at field 714, the MDK set B at field 715, the sequence number at field 716, the MDK key check value at field 717, and the derivative key index (DKI) (e.g. an index that may be used to derive one or more secret keys from the ZCMK or MDK) at field 718. The token server computer 101 may store the received encryption key(s) and the token along with the corresponding account identifying information in the token vault 102.

According to a third option, the token requesting party 116 may request the token server computer 101 to generate the new encryption keys using the information provided by the token requesting party 116, as indicated by the selection of corresponding graphical affordance 721 illustrated in the screenshot 720 provided in FIG. 6C. The token requesting party 116 may provide information for generation of the encryption keys using the fields provided by the user interface. For example, the token requesting party 116 may provide the zone control master key (ZCMK) at field 722, the ZCMK key check value (KCV) at field 724, the sequence number at field 726 and the derivative key index (DKI) at field 728. The token server computer 101 may generate the encryption keys using the provided data and store the generated encryption keys along with the token and the corresponding account identifying information in the token vault 102.

According to a fourth option, the token requesting party 116 may request the token server computer 101 to generate the new encryption keys without the token requesting party 116 providing any information, as illustrated in the screenshot 730 provided in FIG. 6D. The token server computer 101 may generate and store the generated encryption keys along with the token and the corresponding account identifying information in the token vault 102. According to this option, the generated encryption keys may not be provided to the token requesting party 116.

Figure 7:
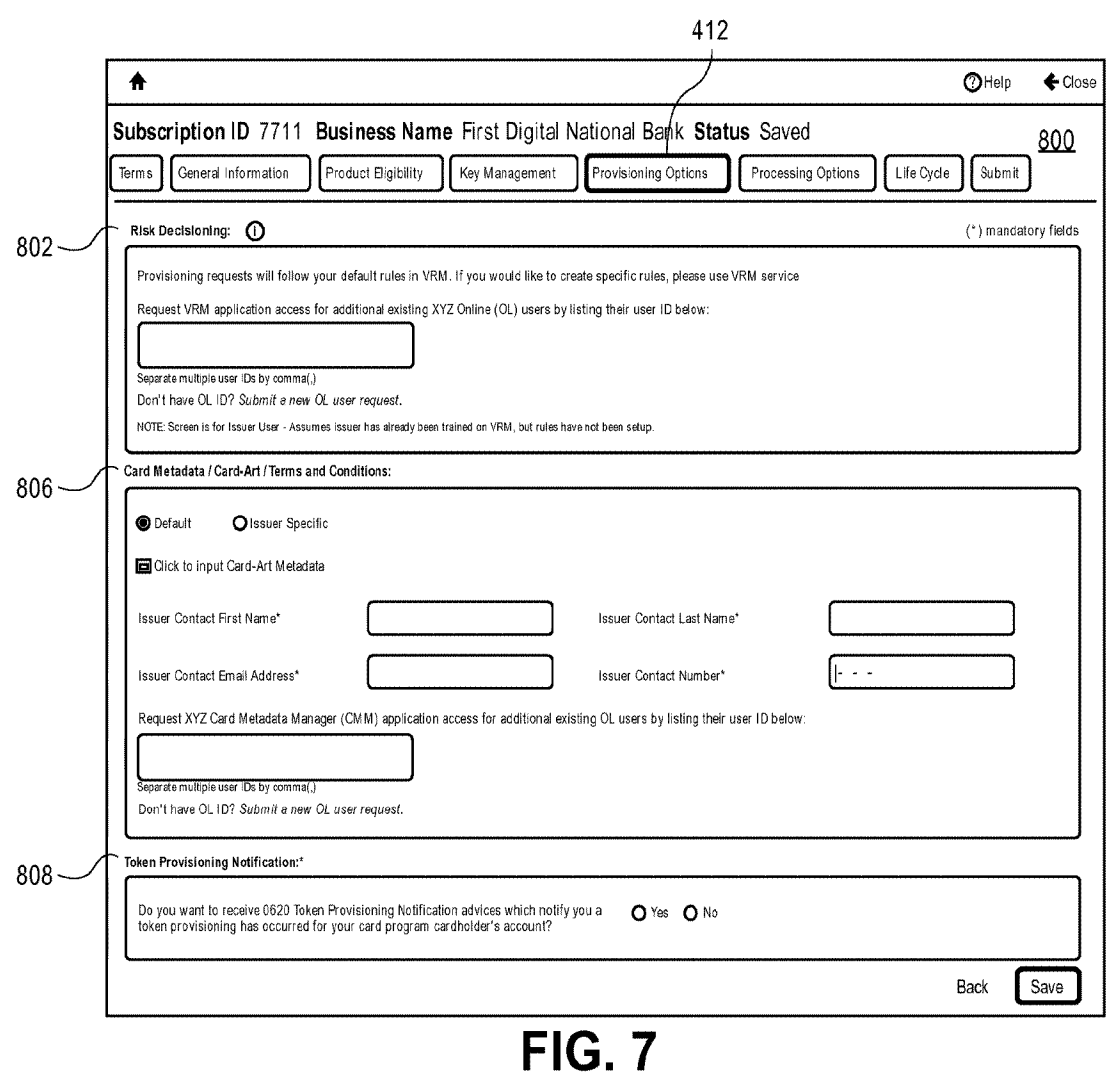

Referring back to FIG. 2, at step S208, the token requesting party 116 may provide notification criteria and provisioning parameters to the token server computer 101 for the tokens generated by the token server computer 101. FIG. 7 illustrates a screenshot 800 illustrating the fifth tab, the provisioning options tab 410, for providing the provisioning parameters and notification criteria to the token server computer 101. The provisioning options tab 410 may include several subsections such as risk decisioning section 802, card metadata/card art/terms and conditions section 806 and the token provisioning notification section 808. The token requesting party 116 may customize the provisioning options using the sections 802, 806 and 808 illustrated on FIG. 7. In some embodiments, the token requesting party 116 may choose to apply the card metadata/card art/terms and conditions to a selected set of account identifiers (e.g. an account range or a BIN range). Accordingly, the token requesting party 116 may provide different card metadata for different accounts. In some embodiments, the token requesting party 116 may assign the same card metadata/card art/terms and conditions to multiple account ranges.

For example, the risk decisioning section 802 allows the token requesting party 116 to request access to a risk management module 112 and the data processor 103 to set up risk decision rules. The token requesting party 116 may need to make a decision as to whether or not to use the risk management module 112 to set up rules for risk decisioning when the token server computer 101 receives the token provisioning request. If the token requesting party 116 decides not to use the risk management module 112, the system may default to automatic approval of the token provisioning request.

If a card is generated for the account, the token requesting party 116 may have the option to customize the design of the card image using the card metadata/card art/terms and conditions section 806. The token requesting party 116 can select a default card art or may provide a specific card art. The token requesting party 116 may also specify any specific terms and conditions that should be presented to the account holder during the token provisioning process on to a user device. The token requesting party 116 may enter a short description to be displayed on the card image displayed on the user device during the token provisioning process. If the token requesting party 116 decides to use specific card art, the token requesting party 116 may download the relevant card art template required to prepare the card art images. The token requesting party 116 may prepare the card art images as per the specifications described in the template and upload the relevant file. If the token requesting party 116 wants to use specific terms and conditions, the token requesting party 116 may upload its terms and conditions file. The terms and conditions file may be a text file or HTML file. The token requesting party 116 may assign card art information at an account level, BIN level, product level, and issuer level. Existing online IDs that need access to this service can be provided in the field provided. In some embodiments, the processing options selected by the token requesting party 116 for its first subscription may apply to all subsequent subscriptions.

Using the token provisioning notification section 808 of the provisioning options tab 410, the token requesting party 116 may request that it be notified (e.g. receive a message) when a token has been provisioned for one of the accounts owned or managed by the token requesting party 116. For example, the token requesting party 116 may request to receive notifications when Lifecycle Management events occur, when Active Account Management events occur, and/or when Account Parameter Index verification fails. In some embodiments, the token requesting party 116 may have the option to allow the token server computer 101 to send token transaction history alerts to the account holders and/or the token requesting party 116.

Figure 8:
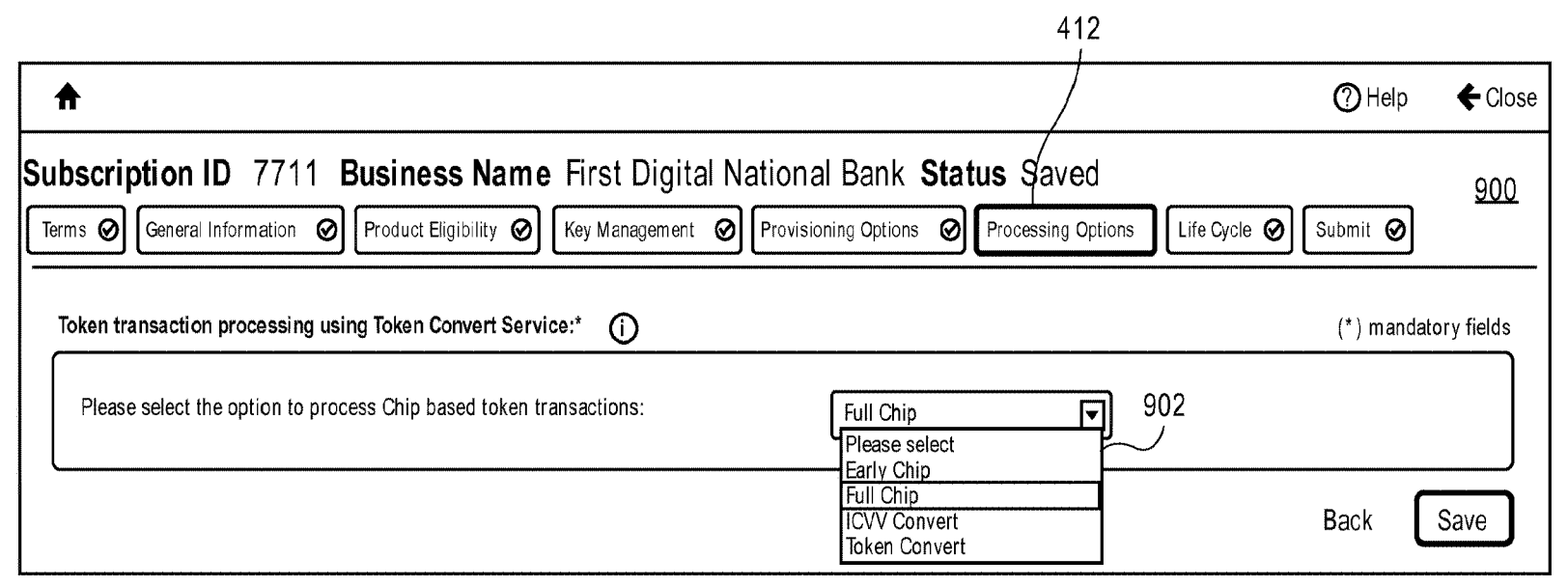

The token server computer 101 may also provide additional customization options to the token requesting party 116. For example, the token requesting party 116 may navigate to processing options tab 412 to select options available for token transaction processing, as shown in the screenshot 900 of the user interface illustrated in FIG. 8. The token requesting party 116 may be asked to agree to use a token convert service provided by the token server computer 101 to de-tokenize the tokens during a transaction. The token convert service may minimize the issuer processing requirements for device-initiated token transactions. The token requesting party 116 may be asked to select an option to process token transactions. For example, a dropdown menu 902 may be provided to the token requesting party 116 with available options for token processing. If the token requesting party 116 does not agree to use the token convert service, the token requesting party 116 may not be able to interact with the token server computer 101.

The token requesting party 116 may navigate to lifecycle tab 414 to take advantage of the lifecycle management service for management of lifecycle activities for generated tokens. The token requesting party 116 may indicate an entity that will use the lifecycle management service for the generated tokens by selecting the provided entities on the screenshot 1000 of the user interface 104 illustrated in FIG. 9. Optionally, if the token requesting party 116 has an existing subscription with the token server computer 101, the token requesting party 116 may request access for additional entities to the lifecycle management service by entering valid IDs in request lifecycle management application access field 1002. The token lifecycle management options the token requesting party 116 selects for its first subscription may become the default selection for subsequent subscriptions.

After the token requesting party 116 has entered all the required information on all menu tabs 402-414, the token requesting party 116 can submit the information on the submit tab 416, as illustrated in FIG. 10. On the screenshot 1100 shown in FIG. 10, all menu tabs 402-414 may display a visual cue (e.g. green check mark) 1102 next to menu tab name before the token requesting party 116 can submit the subscription information. The visual cue 1102 may indicate that each tab 402-414 has been completed satisfactorily. The token requesting party 116 may be required to select "Yes" to agree with a licensing requirement 1104 to successfully proceed with the submission. The estimated date for completion of configuration may also be shown in the setup date section 1106 of this screenshot 1100. The setup date may only be a target date for completion.

After the token requesting party 116 clicks the submit tab 416, a pop-up window may open up to give the token requesting party 116 an opportunity to cancel the submission, preview the subscription information, or submit the subscription. The preview may be available in the form of a PDF document. The token requesting party 116 may cancel to exit submission and correct information in any menu tab, if needed. Clicking submit may be the final action and may not be undone. After the information is submitted, the subscription may be available in a read-only format for review. If there are errors that prevent the subscription from being submitted, the token server computer 101 may identify the errors and communicate the errors to the token requesting party 116. In response to the identified errors, the token requesting party 116 can create a new subscription or edit the saved subscription.

Once the token requesting party 116 completes providing information for (e.g. customizing) the token generation, the token server computer 101 may proceed with generation of the tokens.

Referring back to FIG. 2, at step S210, after the subscription request is submitted, the token server computer 101 may process the provided information and generate the tokens based on the information provided by the token requesting party 116. The token server computer 101 may store the generated tokens along with corresponding encryption keys and account identifiers in the token vault 102.

At step S212, the token server computer 101 may optionally provide a copy of the generated tokens to the token requesting party 116. The token server computer 101 may also provide a mapping illustrating the correspondence between the tokens and the corresponding account identifiers to the token requesting party 116.

At step S214, the token server computer 101 may provision the generated token(s) on user devices of the account holders using the provisioning module 108. For example, if a payment token is generated for a payment account of the account holder, the token may be provisioned on a mobile communication device of the account holder. The account holder may initiate a transaction using the token provisioned on their user device.

Figure 11:
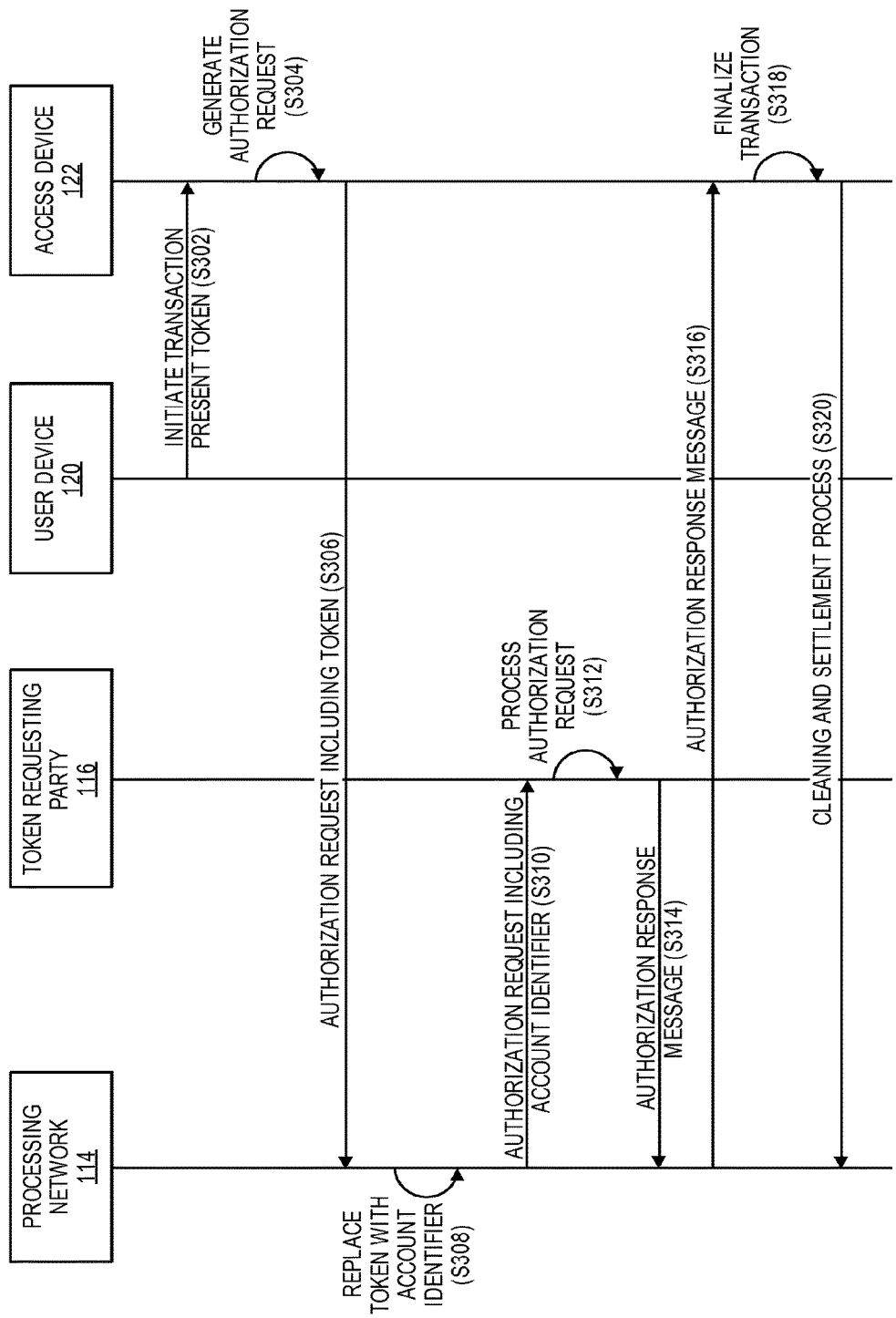
FIG. 11 illustrates a flowchart for conducting a transaction using a token, in accordance with some embodiments of the invention.

A tokenized transaction processing is discussed next in connection with FIG. 11. The transaction may be a purchase transaction or an access transaction where the user presents a token representing their account to an access device.

In an exemplary purchase transaction, the user (e.g. account holder) purchases a good or service at from a merchant using a user device 120 (e.g., a mobile communication device). At step S302, the user device 120 can interact with an access device 122 at a merchant associated with a merchant computer to initiate the transaction. The user device 120 may present the token stored thereon to the access device 122. For example, the user may tap the user device 120 against a near field communications (NFC) reader in the access device 122. Alternatively, the user may indicate payment details to the merchant electronically, such using a digital wallet or in through an online transaction. In some purchase transactions the access device 122 may include a virtual access device (e.g., a computing system providing a merchant website or "backend" services for a merchant application executing on the user device 120). In these examples, the merchant computer may be thought of as implementing the virtual access device.

At step S304, the access device 122 (or virtual access device, which may be at the merchant computer) generates an authorization request message to cause the transaction to be performed. The authorization request message may include the token and information associated with the transaction. In some embodiments, the information associated with the transaction may be encrypted using encryption keys, such as a limited use key (LUK). The encryption keys may be used to create cryptograms from the transaction information, and these cryptograms may be of limited use and may be used to verify that transactions are authentic.

The authorization request message may be an electronic message that is sent to the transaction processing network computer 114 and/or an issuer of the user account to request authorization for a transaction using the account. An authorization request message, according to some embodiments, may comply with a message type defined by the International Organization for Standardization (ISO) 8583 standard, which is a standard for systems that exchange electronic transaction information associated with payments made by users using a user device (which could be a mobile communication device). The authorization request message may include an issuer account identifier that may be associated with a user device or a user account.

As provided above, the authorization request message may also comprise additional data elements. For example, the authorization request message may include "identification information" including, by way of example only: a service code, a CVV (card verification value), a dCVV (dynamic card verification value), an expiration date, etc. The authorization request message may also include "transaction information," such as any information associated with a current transaction, such as the transaction amount, merchant identifier, merchant location, etc., as well as any other information that may be utilized in determining whether to identify and/or authorize a transaction. The authorization request message may also include other information, such as an identifier of the access device 122 that generated the authorization request message, information about the location of the access device 122, etc.

At step S306, the access device 122 may send the authorization request message including the token to the transaction processing network computer 114. In some embodiments, the access device 122 may first send the authorization request message to an acquirer computer, which may then forward the authorization request message to the transaction processing network computer 114. The acquirer computer may be a system of an acquirer providing an account of the merchant, which will ultimately receive the funds for the transaction from an issuer providing the user account.

After receiving the authorization request message, the transaction processing network computer 114 may analyze the authorization request message to determine that the authorization request message includes a token. The transaction processing network computer 114 may query the token vault 102 to find the account identifier represented by the token. At step S308, the transaction processing network computer 114 may replace the token with the corresponding account identifier. At step S310, the transaction processing network computer 114 may transmit the authorization request message including the account identifier to the token requesting party 116 (e.g. an issuer computer associated with the issuer of the user's account). The transaction processing network computer 114 may identify the appropriate token requesting party 116 based on the token included in the authorization request message.

At step S312, the token requesting party 116 may process the authorization request, for example, to determine a risk associated with the authorization request and/or whether there are sufficient funds to pay for the transaction. Based on the processing, the token requesting party 116 may determine whether the authorization request should be approved or denied. The token requesting party 116 may generate an authorization response message including an indication of whether the transaction (e.g. the authorization request) is approved or denied.

At step S314, the token requesting party 116 may send the authorization response message back to the transaction processing network computer 114 to indicate whether or not the current transaction is authorized. The authorization response message may be an electronic message reply to an authorization request message generated by an issuing financial institution or a transaction processing network, and may comply with the ISO 8583 standard. The authorization response message may include, by way of example only, one or more of the following status indicators: Approval—transaction was approved; Decline—transaction was not approved; or Call Center—response pending more information, merchant must call the authorization phone number. The authorization response message may also include an authorization code, which may be a code that an issuer returns in response to an authorization request message in an electronic message (either directly or through the transaction processing network) to the access device 122 (e.g. point of sale (POS) equipment) that indicates an approval of the transaction, and may serve as proof of authorization.

At step S316, the transaction processing network computer 114 receives the authorization response message from the token requesting party 116. The transaction processing network computer 114 may replace the account identifier with the corresponding token so that the actual account number is never provided to the access device 122. The transaction processing network computer 114 may then transmit the authorization response message to the access device 122. If there was an acquirer between the transaction processing network computer 114 and the access device 122, the authorization response message may be first sent to the acquirer computer, which may then send the authorization response message back to the access device 122, where the merchant can determine whether to proceed with the transaction. In some embodiments, such as when a fraud rule is triggered at transaction processing network computer 114, the transaction processing network computer 114 may decline a transaction previously authorized by token requesting party 116.

At step S318, after the access device 122 receives the authorization response message, the access device 122 may provide the authorization response message for the user. The response message may be displayed by a display device (e.g., a display device that is part of or coupled to the access device 122), printed out on a receipt, communicated to the user device 120, etc. Alternately, if the transaction is an online transaction (e.g., via a website or application), the access device 122 may provide a web page, display module, or other indication of the authorization response message to the user device 120.

At step S320, a normal clearing and settlement process can be conducted by the transaction processing network computer 114. A clearing process is a process of exchanging financial details between an acquirer and an issuer to facilitate posting to a user's account and reconciliation of the user's settlement position. However, it should be noted that embodiments of the invention are not limited to a single settlement process.

In some embodiments, the user device may be used to obtain access to a resource or a location. For example, the user device may include data which is passed to an access device to allow the user to access a building or a room in the building. For example, a building operator system may provision the user device with access data (e.g. an access token) that allows the user to access the building. Once the user device is provisioned with access data, it may be used to conduct an access transaction, similar to the payment transaction discussed above. When the user presents the user device to the access reader of the building, access may be granted to the user.

The user interface 104 discussed above may also include an administrator module. In some embodiments, only transaction processing network administrators may have access to the administrator module. The administrator module may allow the administrator to view all the subscriptions a token requesting party has submitted, manage the submitted subscriptions, change an enrollment type of the token requesting party from one model to another, and update enrollment status after the configuration setup is complete for respective internal systems. The administrator can update the status of subscription or delete a subscription. The delete option is used when the token requesting party requests the transaction processing network to delete the subscription from the system to ensure that the payment processor does not process the subscription.

Embodiments of the present application provide a token server computer that enables a token requesting party to provide (1) a range of Bank Identification Numbers (BINs) or a range of account numbers for which to generate a token, (2) one or more encryption keys to be used by the token server computer for provisioning the tokens on behalf of the token requesting party, and (3) a request to generate notifications when tokens are provisioned for account numbers owned, generated or otherwise managed by the token requesting party. Accordingly, embodiments enable a token requesting party to control and customize the token generation process handled by a token server computer.

In some embodiments, the token requesting party may be responsible for any loss caused by a fraudulent use of an account or a token associated with the account issued by the token requesting party. Accordingly, it may be in the best interest of the token requesting party to control the generation of tokens.

Embodiments further allow multiple token requesting parties (e.g. multiple account issuers) to register with the token server computer at the same time. Onboarding processes are preferably quick and efficient. Transactions described herein may include financial transactions conducted with electronic wallets.

Figure 12:
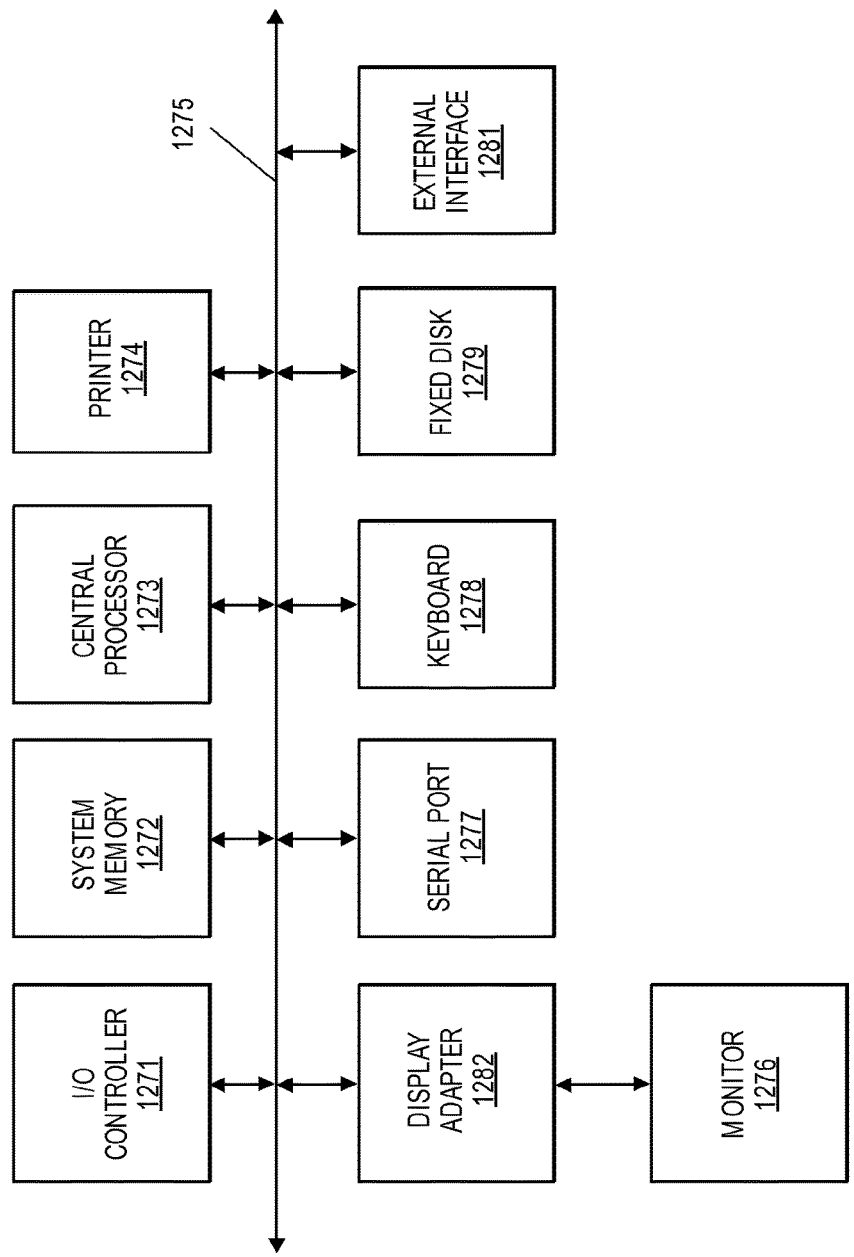
FIG. 12 shows an exemplary computer system according to embodiments of the present invention.

The various participants and elements shown in FIGS. 1-11 may operate one or more computer apparatuses (e.g., a server computer) to facilitate the functions described herein. Any of the elements in FIGS. 1-11 may use any suitable number of subsystems to facilitate the functions described herein. Examples of such subsystems or components are shown in FIG. 12. The subsystems such as a printer 1208, keyboard 1216, fixed disk 1218 (or other memory comprising computer readable media), monitor 1212, which is coupled to a display adapter 1210, and others are shown. Peripherals and input/output (I/O) devices, which couple to I/O controller 1202, can be connected to the computer system by any number of means known in the art, such as serial port 1214. For example, serial port 1214 or external interface 1220 can be used to connect the computer apparatus to a wide area network such as the Internet, a mouse input device, or a scanner. The interconnection via system bus allows the central processor 1206 to communicate with each subsystem and to control the execution of instructions from system memory 1204 or the fixed disk 1218, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a non-transitory computer readable storage medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
providing, by a token server computer operated by a token service provider, an interface to a party, wherein the party controls generation of payment tokens for account identifiers associated with accounts issued the party via the interface;
receiving, at the token server computer, a plurality of sets of account identifiers from a computer operated by the party via the interface;
receiving, at the token server computer, a request to generate payment tokens for the plurality of sets of account identifiers such that each generated payment token represents an account identifier among the plurality of sets of account identifiers;
for each account identifier in the plurality of sets of account identifiers:
determining, by the token server computer, whether the account identifier is eligible for tokenization, wherein the determining includes:
searching, by the token server computer, a token database for an entry associated with the account identifier;
if the token database includes the entry associated with the account identifier:
identifying the account identifier as ineligible for tokenization,
transmitting a message to the party indicating that the account identifier is ineligible for tokenization, and
selecting a next account identifier among the plurality of sets of account identifiers; and
if the token database does not include the entry associated with the account identifier:
identifying the account identifier as eligible for tokenization,
generating, by the token server computer, a payment token for the account identifier, wherein the payment token for the account identifier substitutes the account identifier in a payment transaction initiated using the payment token;
creating a new entry in the token database to store the payment token associated with corresponding account identifier; and
selecting the next account identifier among the plurality of sets of account identifiers.

2. The method of claim 1, further comprising:
receiving, at the token server computer, a notification criteria from the computer operated by the party via the interface; and
sending, by the token server computer, a notification to the computer operated by the party when a token satisfies the notification criteria.

3. The method of claim 2, wherein the notification criteria includes generation of the token or provisioning of the token.

4. The method of claim 1, further comprising:
receiving, at the token server computer, provisioning parameters for the payment token via the interface, wherein the provisioning parameters include one or more of risk decision rules, design elements or provisioning conditions; and
provisioning, by the token server computer, the payment token on a user device based on the provisioning parameters.

5. The method of claim 1, further comprising:
receiving, at the token server computer, an identification of an entity for managing the payment token via the interface; and
assigning management rights of the payment token to the entity.

6. A token server computer operated by a token service provider, comprising:
one or more processors;
a non-transitory computer readable storage medium communicatively coupled with the one or more processors and storing instructions which, when executed by the one or more processors, cause the token server computer to:
provide an interface to a party, wherein the party controls generation of payment tokens for account identifiers associated with accounts issued the party via the interface;
receive a plurality of sets of account identifiers from a computer operated by the party via the interface;
receive a request to generate payment tokens for the plurality of sets of account identifiers such that each generated payment token represents an account identifier among the plurality of sets of account identifiers;
for each account identifier in the plurality of sets of account identifiers:
determine whether the account identifier is eligible for tokenization, wherein determining includes:
searching a token database for an entry associated with the account identifier;
if the token database includes the entry associated with the account identifier:
identifying the account identifier as ineligible for tokenization,
transmitting a message to the party indicating that the account identifier is ineligible for tokenization, and
selecting a next account identifier among the plurality of sets of account identifiers; and
if the token database does not include the entry associated with the account identifier:
identifying the account identifier as eligible for tokenization,
generating a payment token for the account identifier, wherein the payment token for the account identifier substitutes the account identifier in a payment transaction initiated using the payment token;
creating a new entry in the token database to store the payment token associated with corresponding account identifier; and
selecting the next account identifier among the plurality of sets of account identifiers.

7. The token server computer of claim 6, wherein the instructions which, when executed by the one or more processors, further cause the token server computer to:
receive a notification criteria from the computer operated by the party via the interface; and
send a notification to the computer operated by the party when a token satisfies the notification criteria.

8. The token server computer of claim 7, wherein the notification criteria includes generation of the token or provisioning of the token.

9. The token server computer of claim 6, wherein the instructions which, when executed by the one or more processors, further cause the token server computer to:
receive provisioning parameters for the payment token via the interface, wherein the provisioning parameters include one or more of risk decision rules, design elements or provisioning conditions; and
provision the payment token on a user device based on the provisioning parameters.

10. The token server computer of claim 6, wherein the instructions which, when executed by the one or more processors, further cause the token server computer to:
receive an identification of an entity for managing the payment token via the interface; and
assign management rights of the payment token to the entity.

* * * * *